(12) United States Patent
Song et al.

(10) Patent No.: US 7,162,773 B2
(45) Date of Patent: Jan. 16, 2007

(54) VENT CONTROL KNOB FOR AN AUTOMOTIVE VEHICLE AIR VENT

(75) Inventors: Andi J. Song, Ypsilanti, MI (US); Daniel Lim, Ann Arbor, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 10/705,575

(22) Filed: Nov. 10, 2003

(65) Prior Publication Data

US 2005/0097704 A1    May 12, 2005

(51) Int. Cl.
*A47B 95/02* (2006.01)
*B60H 1/34* (2006.01)

(52) U.S. Cl. .................. 16/110.1; 454/155; 454/162; 16/441

(58) Field of Classification Search ............. 16/110.1, 16/441, DIG. 30; 454/155 X, 162, 314, 454/316, 152
See application file for complete search history.

(56) References Cited

U.S. PATENT DOCUMENTS

| 2,940,375 | A | * | 6/1960 | Schucker et al. ............ 454/314 |
| 3,552,295 | A | * | 1/1971 | Armstrong ................. 454/315 |
| 3,680,470 | A | * | 8/1972 | Neece ........................ 454/313 |
| 4,665,804 | A | * | 5/1987 | Miyasaka .................... 454/315 |
| 5,036,753 | A | * | 8/1991 | Ostrand et al. ............. 454/155 |
| 5,238,448 | A | * | 8/1993 | Komori et al. .............. 454/155 |
| 5,364,303 | A | * | 11/1994 | Terry ......................... 454/155 |
| 5,563,388 | A | * | 10/1996 | Nord ......................... 200/61.88 |
| 5,599,230 | A | * | 2/1997 | Naruse et al. .............. 454/155 |
| 5,766,070 | A | * | 6/1998 | Schwarz ..................... 454/155 |
| 6,497,616 | B1 | * | 12/2002 | Yamaguchi ................. 454/155 |
| 6,736,719 | B1 | * | 5/2004 | Gehring et al. ............. 454/155 |

FOREIGN PATENT DOCUMENTS

| DE | 3719837 C1 | * | 1/1989 |
| GB | 2232760 A | * | 12/1990 |
| JP | 4-18246 | | 2/1992 |
| JP | 5-82617 | | 11/1993 |
| JP | 10-138750 | | 5/1998 |
| JP | 10-250357 | | 9/1998 |
| KR | 2003031219 A | * | 4/2003 |

* cited by examiner

*Primary Examiner*—Brian E. Glessner
*Assistant Examiner*—Mark Williams
(74) *Attorney, Agent, or Firm*—Gifford, Krass, Groh, Sprinkle, Anderson & Citkowski, P.C.

(57) ABSTRACT

The present invention provides a control knob assembly for a register that is used in a blower of an HVAC system of an automobile. The assembly includes a knob portion having an open side for receiving a vane of the register in snap fit engagement. The vane of the register includes a notched portion disposed on a rear edge thereof. A compressively resilient pad is disposed in the notched portion and extends outwardly beyond the rear edge to contact an inner surface of the knob portion and provide a snug fit between the vane and the knob portion. During manipulation of the vane by the user, the compressively resilient pad does not compress resulting in a consistently stable and robust feeling experienced by the user.

4 Claims, 1 Drawing Sheet

VENT CONTROL KNOB FOR AN AUTOMOTIVE VEHICLE AIR VENT

FIELD OF THE INVENTION

The present invention relates to control knobs for air conditioner registers and more particularly to a control knob that provides enhanced stability between the control knob and the air register resulting in a more robust and quality design.

BACKGROUND OF THE INVENTION

In heating and cooling systems for automobiles it is desirable to control the direction of air emitted through the air vents so the vehicle operator can control the spatial heating or cooling of the vehicle.

Typically an operating lever or control knob is provided for adjusting the angle orientation of the vane or vanes of the air vent to control the direction of airflow.

Examples of operating levers for controlling the direction of airflow through an air vent are disclosed in Japanese Patent Nos. JP10250357 and JP0418246. The '357 reference discloses an operating lever of the sort in FIG. 6 wherein a silicone pad 27 is disposed between the front edge of a vane of the air vent and the control knob 12. The '246 reference also discloses a silicone pad disposed between a vane and control knob in a similar fashion. By constructing the operating levers in the manner disclosed in either of these references, compression forces act on the compressively resilient pad disposed between the control knob and the vane during manipulation that result in the user experiencing an unstable feeling at the operating lever.

The present invention seeks to provide an operating lever or control knob for use with an air vent of an automobile that enhances the stability provided between the control knob and a vane of the air vent whereby a user experiences a more durable and robust feeling while manipulating the control knob.

SUMMARY OF THE INVENTION

The present invention provides a control knob for use on a vane of an air register of a vehicle. The vane includes a front and rear edge wherein the rear edge includes a notched portion formed therein.

The control knob comprises an inner surface and a side having an open portion dimensioned to receive the vane in snap fit engagement into the inner surface.

A compressively resilient pad is dimensioned to be received into the notched portion formed at the rear edge of the vane. The pad extends outwardly beyond the rear edge of the vane when seated within the notched portion. The portion of the pad that extends beyond the rear edge is operative to contact a first portion of the inner surface of the control knob. In this fashion the compressively resilient pad is operative to consistently urge the front edge of the vane into contact with a second portion of the inner surface of the control knob such that the user experiences a more robust and stable feel when controlling the knob to adjust the direction of airflow through the air vent.

BRIEF DESCRIPTION OF THE DRAWINGS

A better understanding of the present invention will be had upon reference to the following detailed description when read in conjunction with the accompanying drawings in which like parts are given like reference numerals and wherein.

DETAILED DESCRIPTION OF THE INVENTION

The present invention relates to a control knob assembly disposed on an air vent of a vehicle that is operative to direct airflow into the passenger compartment. The control knob assembly includes a compressively resilient pad disposed between an inner surface of the control knob assembly and an edge of a vane of an air vent. The compressively resilient pad operates to stabilize the control knob in relation to the vane to provide a consistent and snug fit between the components during movement of the control knob to direct airflow through the vent. It is appreciated that the compressively resilient pad is resilient against compressive forces but is not susceptible to thermodynamic changes that can be experienced by other resilient materials such as leaf springs formed of metal or plastic.

Figure 1:
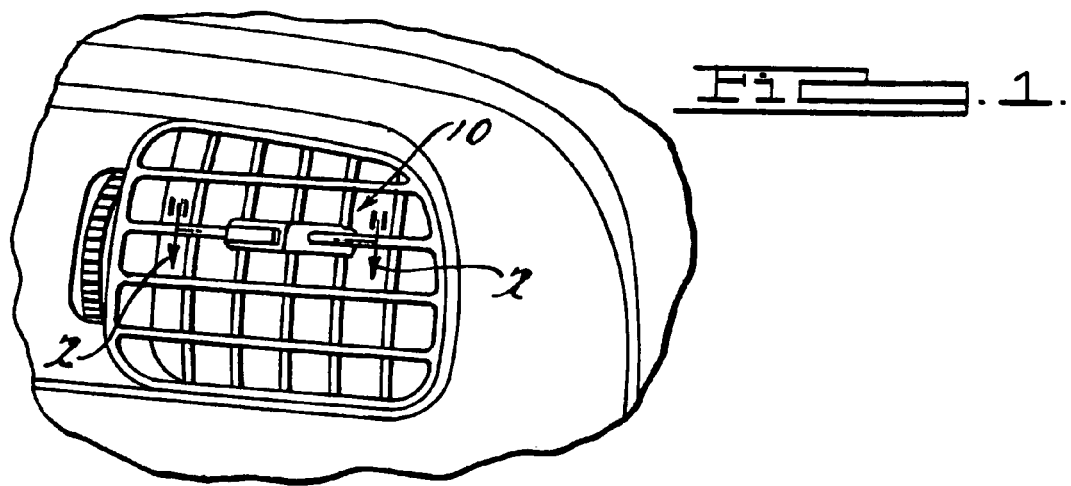
FIG. 1 illustrates the inventive control knob disposed on an air vent portion of an instrument panel of a vehicle.

As illustrated in FIG. 1, the present invention has utility as a control knob assembly 10 for a conventional HVAC air vent disposed within a vehicle's instrument panel. Although the following description relates to the inventive control knob assembly 10 being associated with an air vent disposed in a vehicle, it is appreciated that the inventive concept may be utilized to control other air vents or registers in a similar fashion.

Figure 2:
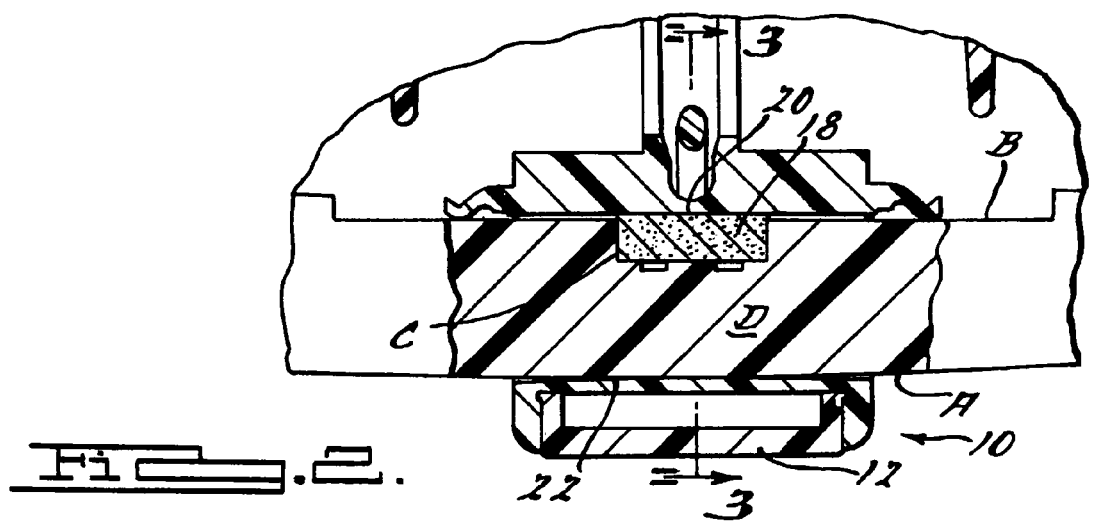
FIG. 2 illustrates a cross-sectional top view of the inventive control knob disposed on a vane of the air vent as according to the invention.
Figure 3:
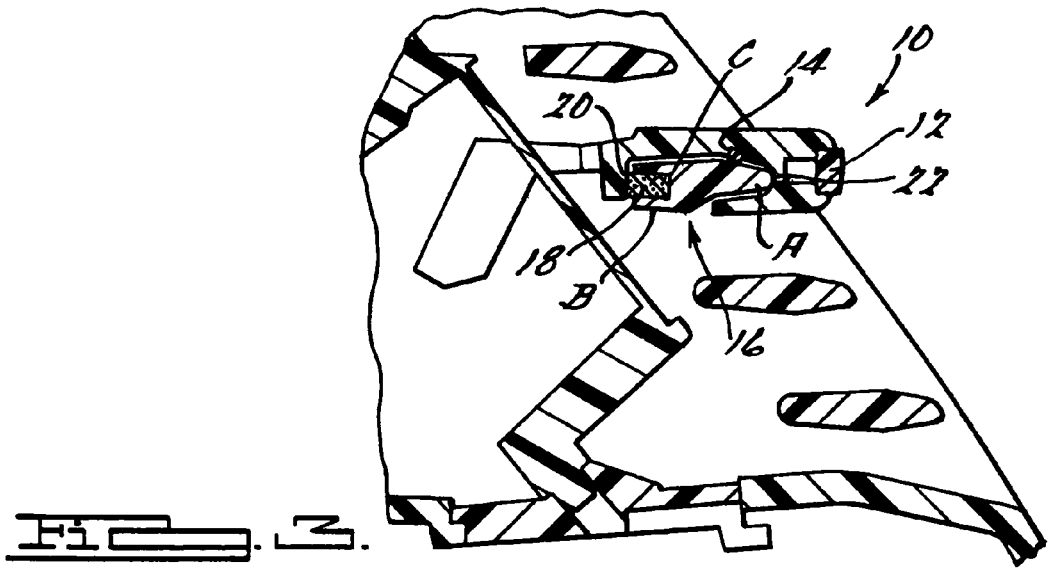
FIG. 3 is a perspective side view of the inventive control knob disposed on a vane of the air vent as according to the invention.

With reference now to FIG. 2, the inventive control knob assembly 10 includes a knob portion 12 having an inner surface 14. As best illustrated in FIG. 3, the knob portion allows a user to manipulate the vane to a desired position to direct airflow accordingly while positioned in the passenger compartment. The knob may be made from a plurality of materials suitable for such purpose which illustratively include plastic, wood, graphite, metal and/or glass.

The knob portion includes a side having an open portion 16 dimensioned to receive the vane in snap fit engagement into the inner surface 14 of the knob portion 12. It is appreciated that the inner surface 14 of the knob portion 12 is dimensioned to be slightly larger than the outer surface of the vane such that the vane and knob portion snap fittingly engage in a complementary fashion.

A compressively resilient pad 18 is dimensioned to be received into the notched portion C formed at the rear edge B of the vane D. It is appreciated that the rear edge B of the vane D is the edge of the vane D closest to the engine compartment with the air vent V disposed in the vehicle. Accordingly, the front edge A of the vane D is closest to the passenger compartment of the vehicle. In a preferred embodiment, the compressively resilient pad is formed of silicone; however, it is appreciated that other resiliently compressive materials may be used such that the same compressive and elastic effects are realized. Such materials may illustratively include rubber, foam rubber or the like.

Once seated in the notched portion C, the compressively resilient pad 18 extends outwardly beyond the rear edge B to contact a first portion 20 of the inner surface 14 of the knob portion 12. The compressively resilient pad 18 is operative to consistently urge the front edge A of the vane into contact with a second portion 22 of the inner surface 14 of the knob portion 12. In this fashion, the control knob assembly 10 provides a consistently snug fit between the vane D and the knob portion 12 such that a sturdy and tight engagement between the knob portion 12 and the vane D is maintained during manipulation of the air vent.

In accordance with the present invention, when a user applies force on the knob portion 12 to manipulate the vane D for changing the direction of airflow, the knob portion 12 will not move relative to the vane D due to compression forces on the compressively resilient pad 18. In this fashion, a robust and consistently stable tactile feeling is experienced by the user. By disposing the compressively resilient pad 18 at the front edge A of the vane D, the user would experience an unstable feeling during manipulation of the air vent due to the compression force exerted on the compressively resilient pad 18. The present invention avoids this unstable feeling by disposing a compressively resilient pad at the rear edge B of the vane D such that it maintains an urging force on the vane to create a snug fit between the vane D and the knob portion 12 as described above.

In view of the foregoing description of the present invention, other modifications and variations thereto may become apparent to those of skill in the art. It is appreciated that in the description of the above embodiment having utility with air vents of vehicles, the described utility is not meant to serve as a limitation on the practice of the inventive concept. It is the following claims, including all equivalents, which define the scope of the invention.

The invention claimed is:

1. A vent control knob assembly with reduced tactile effort for controlling a position of a vane for an air vent that directs airflow into a vehicle's passenger compartment, said vent control knob assembly comprising:

a vane having a front edge and an opposed rear edge, wherein said rear edge includes one notched portion and the front edge of the vane is arcuate in a longitudinal direction;

a control knob fixedly attached over said vane in snap-fit engagement, wherein said control knob includes an outer surface and an inner surface that defines a recess for receiving said vane, such that a first portion of said inner surface of said knob is adjacent said rear edge of said vane, and a second portion of said inner surface of said knob is adjacent said front edge of said vane, and a side portion of said knob is open for fixedly receiving said vane within the recess in snap-fit engagement; and a compressively resilient pad disposed in the one notched portion of said rear edge of said vane, wherein said pad extends outwardly beyond said rear edge of said vane to contact said first portion of said inner surface of said knob, and said compressively resilient pad operatively forces said front edge of said vane into constant and continuous contact with said second portion of said inner surface of said knob, so that said control knob and said vane move together and the compressively resilient pad maintains a constant resistive force on the vane with respect to the knob during operation of said control knob to reduce tactile effort.

2. The vent control knob assembly of claim 1 wherein the compressively resilient pad is made from silicone.

3. The vent control knob assembly of claim 1 wherein said recess for receiving said vane is dimensioned to be slightly larger than a perimeter of said vane.

4. A vent control knob assembly with reduced tactile effort for controlling a position of a vane for an air vent that directs airflow into a vehicle's passenger compartment, said vent control knob assembly comprising:

a vane having a front edge and an opposed rear edge, wherein said rear edge includes one notched portion and the front edge of the vane is arcuate in a longitudinal direction;

a control knob fixedly attached over said vane in snap-fit engagement, wherein said control knob includes an outer surface and an inner surface that defines a recess for receiving said vane that is dimensioned to be slightly larger than a perimeter of said vane, such that a first portion of said inner surface of said knob is adjacent said rear edge of said vane, and a second portion of said inner surface of said knob is adjacent said front edge of said vane, and a side portion of said knob is open for fixedly receiving said vane within the recess in snap-fit engagement; and a compressively resilient silicone pad disposed in the one notched portion of said rear edge of said vane, wherein said pad extends outwardly beyond said rear edge of said vane to contact said first portion of said inner surface of said knob, and said compressively resilient pad operatively forces said front edge of said vane into constant and continuous contact with said second portion of said inner surface of said knob, so that said control knob and said vane move together and the compressively resilient pad maintains a constant resistive force on the vane with respect to the knob during side-to-side operation of said control knob to reduce tactile effort.

* * * * *